United States Patent [19]

Nunokawa et al.

[11] Patent Number: 4,511,099
[45] Date of Patent: Apr. 16, 1985

[54] HUB OF A TAPE CASSETTE

[75] Inventors: Eiichi Nunokawa, Saku; Toshihiko Ishida, Komoro; Yasuo Ohira, Saku, all of Japan

[73] Assignee: TDK Corporation, Tokyo, Japan

[21] Appl. No.: 552,027

[22] Filed: Nov. 15, 1983

[30] Foreign Application Priority Data

Nov. 30, 1982 [JP] Japan ............................ 57-180042[U]

[51] Int. Cl.³ ...................... B65H 75/18; B65H 75/28
[52] U.S. Cl. ...................................... 242/71.8; 242/74
[58] Field of Search ............ 242/197, 199, 118, 118.1, 242/118.32, 118.31, 68.5, 71.8, 74, 74.1; 425/542, 588; 264/328.1, 328.7

[56] References Cited

FOREIGN PATENT DOCUMENTS 5422459  2/1979  Japan ................................. 264/328.1
668002   6/1979  U.S.S.R. ............................. 242/68.5

Primary Examiner—Harvey C. Hornsby
Assistant Examiner—Stuart J. Maltzman
Attorney, Agent, or Firm—Oblon, Fisher, Spivak, McClelland & Maier

[57] ABSTRACT

A hub of a tape cassette comprising a generally circular outer ring portion (6), an inner ring portion (8) concentric with the outer portion and a generally annular rib (10) connecting the outer and inner ring portions, wherein said annular rib is formed so that its wall thickness increases continuously from a position (A) adjacent to a gate portion (G) for injection molding towards a portion (B) most apart from the gate portion, along the circumferential direction.

2 Claims, 4 Drawing Figures

HUB OF A TAPE CASSETTE

The present invention relates to a hub of a tape cassette to be used for a magnetic tape cassette.

Heretofore, in a magnetic tape cassette, a hub of the cassette to be used for winding a magnetic tape thereon, is usually prepared by injection molding of a resin.

As shown in FIG. 1, a hub 1 of a tape cassette comprises a hub body 2 and a tape clamp 4 resiliently fitted in a recess formed in the peripheral portion of the hub body 2. The hub body 2 has concentrically formed outer ring portion 6 and inner ring portion 8, and the outer ring portion 6 and the inner ring portion 8 are connected by a generally annular rib 10. The inner ring portion 8 is provided with a concentric annular flange 12 formed radially inward of the inner ring portion 8. Further, the annular flange 12 is provided along its inner periphery with a plurality of projections 14 which extend towards the center of the hub.

In general, in a conventional hub body 2, the annular rib 10 connecting the outer and inner ring portions 6 and 8 is inwardly stepped from both side surfaces 16 and 18 of the outer and inner ring portions 6 and 8 and thus has a constant thickness t in its circumferential direction, as shown in FIG. 2, or the wall thickness of the annular rib 10 is radially tapered from the inner ring portion 8 to the outer ring portion 6, as shown in Figure 3. Further, in the injection molding of the hub having such a structure, a gate portion is usually provided at a center portion of the recess of the hub body 2, i.e. at the G portion shown in FIG. 1. In the injection molding conducted in such a manner, a shrinkage is likely to occur at an exterior portion of the outer ring portion located far from the gate portion G, for instance, at the C portion, whereby the circularity and straightness of the hub tends to be impaired.

Accordingly, it is a primary object of the present invention to overcome such drawbacks inherent to the conventional hub of a tape cassette, to eliminate the shrinkage during the injection molding and to provide a hub of a tape cassette having excellent circularity and straightness.

Another object of the present invention is to provide a hub of a tape cassette which can readily be produced by injection molding and which is suitable for mass production.

Namely, the present invention provides a hub of a tape cassette comprising a generally circular outer ring portion 6, an inner ring portion 8 concentric with the outer portion and a generally annular rib 10 connecting the outer and inner ring portions, wherein the annular rib 10 is formed so that its wall thickness increases continuously from a position A adjacent to a gate portion G for injection molding towards a position B most apart from the gate portion, along the circumferential direction.

Now, the hub of a tape cassette according to the present invention will be described in detail with reference to the drawings.

Figure 1:
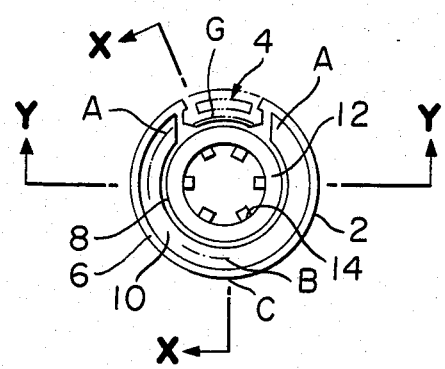
FIG. 1 is a plan view of a hub of a magnetic tape cassette.
Figure 4:
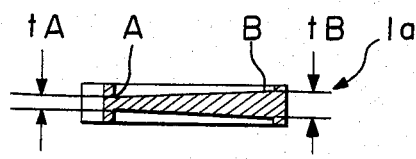
FIG. 4 is a cross sectional view of a hub of a tape cassette according to the present invention, taken along a line of the hub of the present invention corresponding to line X—X in FIG. 1.

As shown in FIGS. 1 and 4, the hub $1a$ of a tape cassette according to the present invention comprises, like the conventional hub 1, a hub body 2 and a tape clamp 4 resiliently fitted in a recess formed in the periphery of the hub body 2. The hub body 2 has an outer ring portion 6 and an inner ring portion 8, and the outer and inner ring portions 6 and 8 are connected by an annular rib 10 also in the same manner as in the conventional hub 1. However, the hub $1a$ of the present invention is substantially different from the conventional hub 1 in that in the hub $1a$ of the present invention, the wall thickness of the annular rib 10 increases continuously from $t_A$ at a position A adjacent to the gate portion G to $t_B$ at the position B most apart from the gate portion G, along its circumferential direction.

With the above-mentioned construction of the hub of the tape cassette according to the present invention, it is possible to completely prevent such a phenomenon that when a resin is injected from the gate portion G in the conventional injection molding, the resin temperature decreases and the resin is solidified as the distance from the gate portion G increases, whereby resin collapse, i.e. shrinkage occurs. More specifically, in the hub of the tape cassette of the present invention, the wall thickness of the annular rib 10 increases from a position A adjacent to the gate portion G towards a position B farthest from the gate portion G, and accordingly the same constant pressure is imparted along the entire circumferential direction of the annular rib 10, whereby a uniform solidified layer will be formed to provide the thickness of the hub continuously increasing from $t_A$ to $t_B$.

It is preferred that the wall thickness of the annular rib (10) increases from the position (A) towards the position (B) at a constant rate of from 1.5 to 2 mm per 18 mm in the length along the circumferential direction. In a typical embodiment, $t_A$ is 1.8 mm and $t_B$ is 3.8 mm where the length from the position (A) to the position (B) along the circumferential direction of the annular rib (10) is 18 mm.

Figure 2:
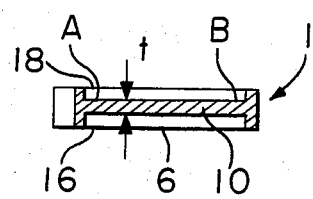
FIG. 2 is a cross sectional view of a conventional hub of a tape cassette taken along line X—X in FIG. 1.
Figure 3:
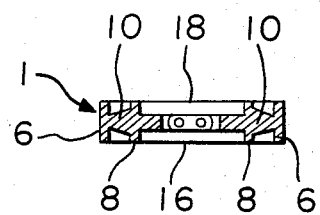
FIG. 3 is a cross sectional view of a conventional hub of a tape cassette taken along line Y—Y in FIG. 1.

In the injection molding of the conventional hub of a tape cassette wherein the thickness t of the annular rib 10 is constant as shown in FIG. 2, the resin injected from the gate portion G tends to be cooled by the mold and the resin temperature decreases as the distance from the gate portion G increases. Accordingly, the formation of the solidified layer of the resin tends to be non-uniform, i.e. the formation of the solidified layer is quick as the distance from the gate portion G increases. Consequently, the resin pressure in the mold becomes to be minimum at the position most apart from the gate portion G, whereby at the portion where resin pressure is low, the resin collapse i.e. shrinkage is likely to occur and the circularity and straightness of the hub tends to be impaired.

Whereas, with the above-mentioned construction of the hub of the tape cassette according to the present invention, a uniform solidified layer is formed along the entire circumferential direction of the annular rib 10 from the position A adjacent to the gate portion G to the position B most apart from the gate portion G. Accordingly, the resin pressure may be maintained to be constant, and the injected resin is uniformly solidified in the entire mold, whereby it is possible to completely prevent the occurrence of shrinkage and to obtain a product having excellent circularity and straightness.

The resin to be used in the present invention is preferably a low frictional resin such as polyacetal, polycarbonate, polyamide including nylon.

We claim:

1. A hub of a tape cassette, comprising:

a generally circular outer ring portion, an inner ring portion concentric with the outer portion, and a generally annular rib connecting the outer and inner ring portions, wherein said annular rib is formed having a tapered wall with a thickness which increases gradually and continuously from a first position adjacent to a gate portion for injection molding towards a second position most furthest from the gate portion, along the circumferential direction.

2. The hub of a tape cassette according to claim 1, wherein the wall thickness of the annular rib increases from the first position towards the second position at a constant rate of from 1.5 to 2 mm for every 18 mm in the length along the circumferential direction.

* * * * *